US011671253B2

(12) United States Patent
Tang et al.

(10) Patent No.: US 11,671,253 B2
(45) Date of Patent: Jun. 6, 2023

(54) DATA PROCESSING METHOD AND DEVICE FOR SAFE DATA COMMUNICATION AND PROCESSING IN IOT ENVIRONMENTS

(71) Applicant: SHENZHEN CHENBEI TECHNOLOGY CO., LTD., Shenzhen (CN)

(72) Inventors: Huifeng Tang, Shenzhen (CN); Zhengbo Ye, Shenzhen (CN)

(73) Assignee: SHENZHEN CHENBEI TECHNOLOGY CO., LTD., Shenzhen (CN)

(*) Notice: Subject to any disclaimer, the term of this patent is extended or adjusted under 35 U.S.C. 154(b) by 182 days.

(21) Appl. No.: 16/950,075

(22) Filed: Nov. 17, 2020

(65) Prior Publication Data
US 2021/0250171 A1 Aug. 12, 2021

(30) Foreign Application Priority Data
Feb. 12, 2020 (CN) .................. CN202010090218

(51) Int. Cl.
*H04L 9/14* (2006.01)
*H04L 9/06* (2006.01)
*H04L 9/08* (2006.01)
*H04L 9/32* (2006.01)

(52) U.S. Cl.
CPC .............. *H04L 9/14* (2013.01); *H04L 9/0618* (2013.01); *H04L 9/0838* (2013.01); *H04L 9/0861* (2013.01); *H04L 9/3226* (2013.01)

(58) Field of Classification Search
CPC ....... H04L 9/14; H04L 9/0618; H04L 9/0838; H04L 9/0861; H04L 9/3226
See application file for complete search history.

(56) References Cited

U.S. PATENT DOCUMENTS

| | | | |
|---|---|---|---|
| 2015/0365473 A1* | 12/2015 | Zuerner | H04L 9/0643 713/168 |
| 2018/0324170 A1* | 11/2018 | Chen | G06F 21/33 |
| 2019/0123901 A1* | 4/2019 | Vijayanarayanan | H04L 9/0894 |
| 2019/0253243 A1* | 8/2019 | Zimmerman | H04W 4/70 |
| 2019/0296969 A1* | 9/2019 | Zimny | H04W 12/06 |
| 2020/0026787 A1* | 1/2020 | Alam | G06F 9/542 |
| 2020/0273586 A1* | 8/2020 | Lee | H04L 9/0894 |

FOREIGN PATENT DOCUMENTS

GB 2588648 A * 5/2021 .......... G06F 21/575

* cited by examiner

*Primary Examiner* — Ali S Abyaneh
(74) *Attorney, Agent, or Firm* — Anova Law Group, PLLC (57) ABSTRACT

A data processing method is provided. A terminal device encrypts a target instruction and a first identifier using a first key to obtain a first ciphertext; and sends the first ciphertext to an IoT device through an IoT platform. The IoT device decrypts the first ciphertext using a second key to obtain the target instruction and the first identifier; determines whether the first identifier matches a second identifier stored locally and comes to a matching result, the first key and the second key being negotiated by the terminal device and the IoT device; and obtains a second cipher text by encrypting the matching result using the second key. The terminal device receives the second ciphertext returned by the IoT device through the IoT platform; decrypts the second ciphertext using the first key to obtain a decryption result; and performs a corresponding operation using the decryption result.

16 Claims, 6 Drawing Sheets

DATA PROCESSING METHOD AND DEVICE FOR SAFE DATA COMMUNICATION AND PROCESSING IN IOT ENVIRONMENTS

CROSS-REFERENCE TO RELATED APPLICATION

This application claims priority to Chinese Patent Application No. 202010090218.6, filed on Feb. 12, 2020, the entire content of which is incorporated herein by reference.

TECHNICAL FIELD

The present disclosure relates to the field of Internet of things and, more specifically, to a data processing method and related apparatus.

BACKGROUND

Internet of things (IoT), also known as the "Internet of connected things," is an extended and expanded network based on the Internet. A huge network is formed by combining various information sensing devices with the Internet to realize the interconnection of people, machines, and things at any time and any place.

The IoT platform provides communication connection capabilities and command control capabilities for IoT devices and terminal devices, to realize the collecting and reporting of the status of the IoT devices and remote control by the terminal devices. The communication among IoT platforms, IoT devices, and terminal devices is based on public networks. Using the public networks as a medium increases the danger of data theft, which can lead to issues such as leakage of important user information or illegal control of the device. Even if the data is encrypted, there is still a risk of data being intercepted and reused, resulting in illegal control of the IoT device.

As a result, there is a need to develop data processing method and device to increase the safety of data communicating and processing in IoT environment.

SUMMARY

One aspect of the present disclosure provides a data processing method implemented by a terminal device. The method includes: encrypting a target instruction and a first identifier using a first key, to obtain a first ciphertext; sending the first ciphertext to an Internet of things (IoT) device through an IoT platform for the IoT device to decrypt the first ciphertext using a second key to obtain the target instruction and the first identifier, and to determine whether the first identifier matches a second identifier stored locally and come to a matching result, the first key and the second key being negotiated by the terminal device and the IoT device; receiving a second ciphertext returned by the IoT device through the IoT platform, the second ciphertext being obtained by the IoT device by encrypting the matching result using the second key; decrypting the second ciphertext using the first key to obtain a decryption result; and performing a corresponding operation using the decryption result.

Another aspect of the present disclosure provides a data processing method implemented by an IoT device. The method includes: receiving a first ciphertext forwarded by an IoT platform, the first ciphertext being obtained by a terminal device by encrypting a first identifier and a target instruction using a first key; decrypting the first ciphertext using a second key to obtain the target instruction and the first identifier; determining whether the first identifier matches a second identifier stored locally and coming to a matching result, the first key and the second key being negotiated by the terminal device and the IoT device; encrypting the matching result using the second key to obtain a second ciphertext; and sending the second ciphertext to the terminal device through the IoT platform for the terminal device to decrypt the second ciphertext using the first key to obtain a decryption result and perform a corresponding operation using the decryption result.

Another aspect of the present disclosure provides a terminal device including a memory and one or more processors. The one or more processors are configured to communicate with the memory and cause the terminal device to perform: encrypting a target instruction and a first identifier using a first key, to obtain a first ciphertext; sending the first ciphertext to an Internet of things (IoT) device through an IoT platform for the IoT device to decrypt the first ciphertext using a second key to obtain the target instruction and the first identifier, and to determine whether the first identifier matches a second identifier stored locally and come to a matching result, the first key and the second key being negotiated by the terminal device and the IoT device; receiving a second ciphertext returned by the IoT device through the IoT platform, the second ciphertext being obtained by the IoT device by encrypting the matching result using the second key; decrypting the second ciphertext using the first key to obtain a decryption result; and performing a corresponding operation using the decryption result.

Another aspect of the present disclosure provides an IoT device including a memory and one or more processors. The one or more processors are configured to communicate with the memory and cause the IoT device to perform: receiving a first ciphertext forwarded by an IoT platform, the first ciphertext being obtained by a terminal device by encrypting a first identifier and a target instruction using a first key; decrypting the first ciphertext using a second key to obtain the target instruction and the first identifier; determining whether the first identifier matches a second identifier stored locally and coming to a matching result, the first key and the second key being negotiated by the terminal device and the IoT device; encrypting the matching result using the second key to obtain a second ciphertext; and sending the second ciphertext to the terminal device through the IoT platform for the terminal device to decrypt the second ciphertext using the first key to obtain a decryption result and perform a corresponding operation based on the decryption result.

Other aspects of the present disclosure can be understood by those skilled in the art in light of the description, the claims, and the drawings of the present disclosure.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

In the specification, claims, and accompanying drawings of the present disclosure, the terms "first," "second," "third," "fourth," and the like (if exist) are intended to distinguish between similar objects but do not necessarily indicate an order or sequence. It should be understood that the data termed in such a way are interchangeable in proper circumstances so that the embodiments of the present disclosure described herein can be implemented, for example, in orders other than the order illustrated or described herein. Moreover, the terms "include," "contain" and any other similar expressions mean to cover the non-exclusive inclusion, for example, a process, method, system, product, or device that includes a list of steps or modules, and are not necessarily limited to those steps or modules that are explicitly listed, but may include other steps or modules not explicitly listed or inherent to such a process, method, system, product, or device.

The division of modules in the present disclosure is merely a logical function division and there may be other division in actual implementation. For example, multiple modules may be combined or integrated into another system, or some features can be omitted or not be executed. In addition, the mutual coupling, the direct coupling, or the communication connection as shown or discussed may be indirect coupling or communication connection through some interfaces, devices or units, and may be in electrical, mechanical or other forms, which is not limited in the present disclosure.

The modules or submodules described as separate components may or may not be physically separated. The modules or submodules may or may not be physical units, or it may also be distributed to multiple circuit modules. Some or all of the modules may be selected according to actual needs to achieve the objectives of the solution in the disclosure.

The network architecture of the data processing method provided in an embodiment of the present disclosure will be described below with reference to FIG. 1.

Figure 1:
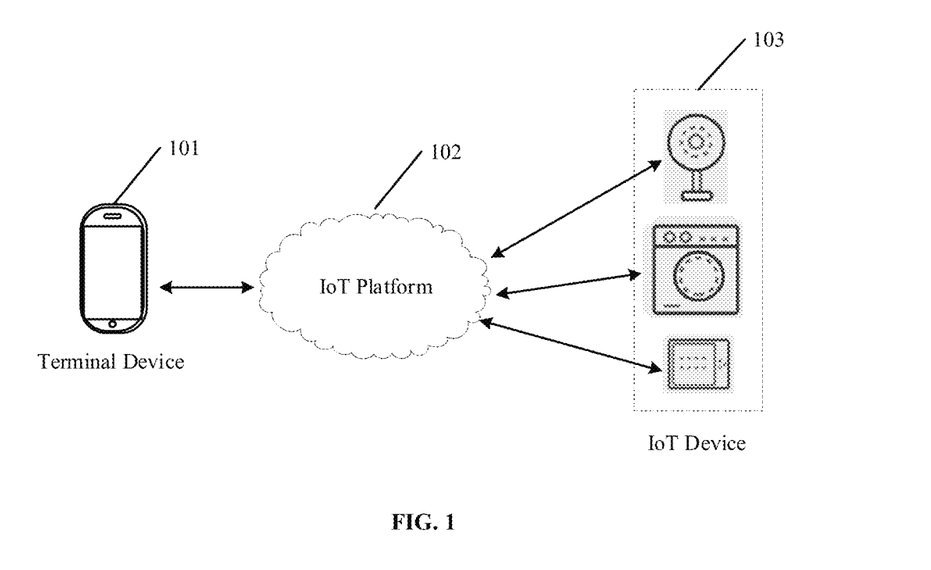
FIG. 1 is a schematic diagram of a network architecture of a data processing method according to an embodiment of the present disclosure.

As shown in FIG. 1, the network architecture of the data processing method includes a terminal device 101, an IoT platform 102, and an IoT device 103. The IoT device 103 can establish a communication connection with the terminal device 101 through the IoT platform 102, and the IoT device 103 can transmit data to the terminal device 101 through the IoT platform 102. More specifically, the terminal device 101 can use a first key to encrypt a target instruction and a first identifier to obtain a first ciphertext. The terminal device can send the first ciphertext to the IoT device through the IoT platform. The IoT device can use a second key to decrypt the first ciphertext to obtain the target instruction and the first identifier, determine whether the first identifier matches a second identifier stored locally and come to a matching result, and use the second key to encrypt the matching result to obtain a second ciphertext and return the second ciphertext to the terminal device. In particular, the first key and the second key can be obtained through a negotiation between the terminal device and the IoT device. The terminal device can use the first key to decrypt the second ciphertext to obtain a decryption result. Further, the terminal device can use the decrypted result to perform the corresponding operations. As such, when the terminal device and the IoT device communicate, not only the data can be encrypted through the negotiated key, but the identifier can also be added during the encryption process, which can prevent the communication from other unauthorized devices and improve the security of data communication.

Figure 2:
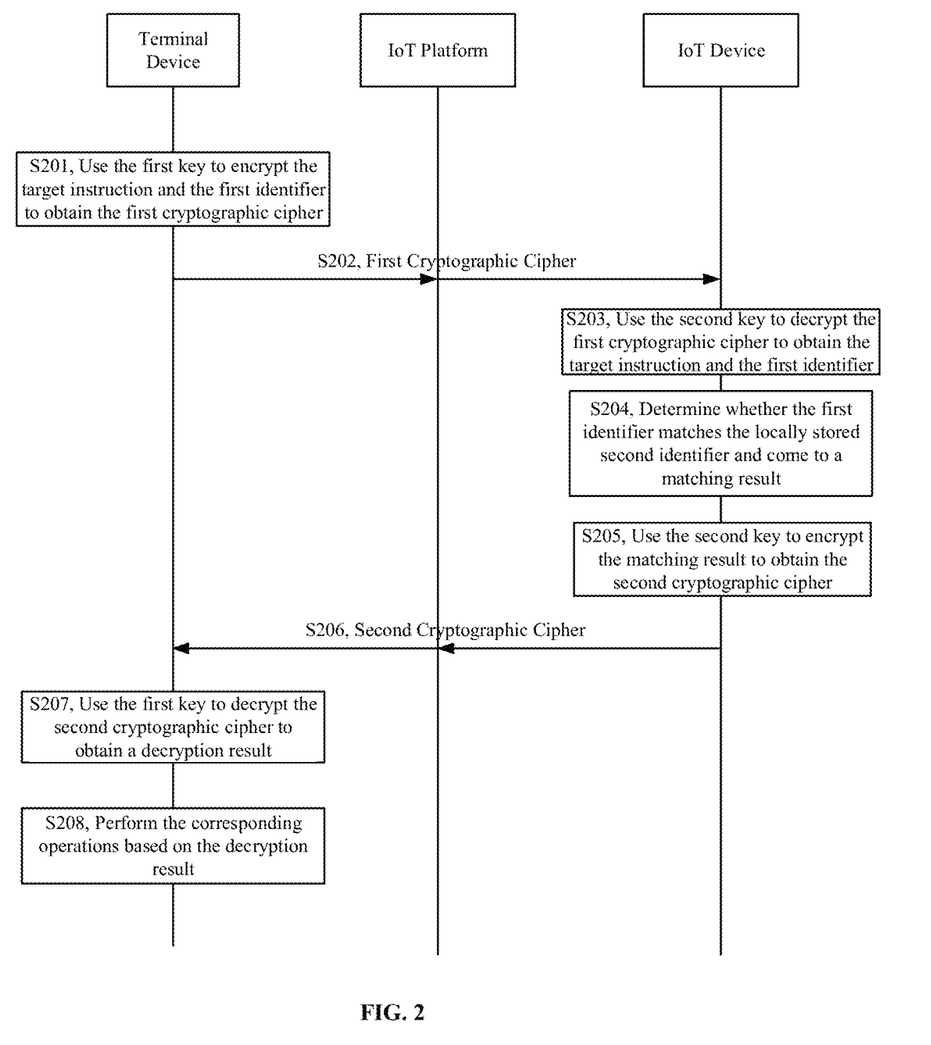
FIG. 2 is a flowchart of the data processing method according to an embodiment of the present disclosure.

FIG. 2 is a flowchart of the data processing method according to an embodiment of the present disclosure. The data processing method will be described in detail below.

S201, the terminal device uses the first key to encrypt the target instruction and the first identifier to obtain the first ciphertext.

In some embodiments, the terminal device may use the first key to encrypt the target instruction and the first identifier to obtain the first ciphertext. For example, the terminal device may display a control panel interface corresponding to the IoT device, the control panel interface including one or more adjustable configurations of the IoT device. Alternatively, the terminal device may be monitoring audio signals to detect voice command(s) from a user directed to the IoT device. The terminal device may receive a user instruction (e.g., from a user selection on the control panel interface, or from a detected voice command) about the target instruction to be implemented by the IoT device, and obtain the target instruction based on the user instruction.

It should be noted that before the terminal device communicates with the IoT device, it may be necessary to bind the terminal device and the IoT device through the IoT platform, and then the terminal device and the IoT device can communicate with each other after binding.

It should also be noted that before the terminal device uses the first key to encrypt the target instruction and the first identifier, the terminal device may need to negotiate keys and identifiers for communication encryption with the IoT device. The keys may include the first key and the second key, and the identifiers may include the first identifier and the second identifier. The first key and the first identifier may correspond to the terminal device, and the second key and the second identifier may correspond to the IoT device. In addition, the first key may correspond to the second key, which means that the first key and the second key can be the same, or they can be public and private keys. The first identifier and the second identifier may be the same or different, as long as they can correspond to each other.

S202, the terminal device forwards the first ciphertext to the IoT device through the IoT platform.

In some embodiments, after the terminal device uses the first key to encrypt the target instruction and the first identifier to obtain the first ciphertext, the terminal device may forward the first ciphertext to the IoT device through the IoT platform.

S203, the IoT device uses the second key to decrypt the first ciphertext to obtain the target instruction and the first identifier.

S204, the IoT device determines whether the first identifier matches a second identifier stored locally and comes to a matching result.

In some embodiments, the first identifier and the second identifier may each include an initial value and non-initial value(s). The initial value of the first identifier and the initial value of the second identifier may be negotiated by the terminal device and the IoT device. In each communication process, the non-initial value(s) of the first identifier and the non-initial value(s) of the second identifier may be adjusted based on the initial value according to an update rule negotiated by the terminal device and the IoT device. The update rule may be obtained through a negotiation between the IoT device and the terminal device, or it may be a built-in update rule in both of the IoT device and the terminal device, as long as each of the initial value and the non-initial value(s) of the first identifier corresponds to each of the initial value and the non-initial value(s) of the second identifier, which is not limited in the present disclosure.

S205, the IoT device uses the second key to encrypt the matching result to obtain the second ciphertext.

In some embodiments, there are two possible matching results. The determination process may include determining whether the first identifier and the second identifier satisfy a preset matching rule. One example of the preset matching rule may be that the first identifier equals the second identifier. Another example of the preset matching rule may be that a sum of the first identifier and the second identifier equals a preset sum value. Another example of the preset matching rule may be that a difference between the first identifier and a first preset value equals a difference between the second identifier and a second preset value. There may be two kinds of matching results. One is that the first identifier matches the second identifier. The other is that the first identifier does not match the second identifier. When the IoT device uses the second key to encrypt the matching result, different matching results may generate different second ciphertexts, which will be described in detail below.

When the matching results shows that the first identifier matches the second identifier, the IoT device may determine that the current communication is valid, and follow the target instruction to execute a target operation and obtain the execution result (e.g., the target instruction may be to increase a temperature setting of the air conditioner to a target temperature value, then the IoT device can adjust, based on the target instruction, the temperature setting of the air conditioner and return an execution result). Subsequently, the IoT device can use the second key to encrypt the execution result and a communication valid identifier to obtain the second ciphertext, where the communication valid identifier may indicate the communication is valid.

When the matching results shows that the first identifier does not match the second identifier, IoT device may determine that the current communication is invalid. The IoT device may not perform the operation corresponding to the target instruction, and at the same time use the second key to encrypt the identifier value of the second identifier and a communication error identifier to obtain the second ciphertext, where the communication error identifier may indicate that the communication is invalid.

S206, the IoT device forwards the second ciphertext to the terminal device through the IoT platform.

S207, the terminal device uses the first key to decrypt the second ciphertext to obtain the decrypted result.

In some embodiments, the terminal device can use the first key to decrypt different second ciphertexts and obtain different decryption results. The first type of decryption results may include the communication valid identifier and the execution result corresponding to the target instruction, and the second type of decryption result may include the communication invalid identifier and the identifier value of the second identifier.

S208, the terminal device performs the corresponding operation based on the decryption result.

Different second ciphertexts may correspond to different decryption results, and the terminal device may perform different operations based on different decryption results. The operation performed by the terminal device corresponding to the decryption result that includes a communication valid identifier may include: adjusting the first identifier based on the update rule negotiated by the terminal device and the IoT device. The operation performed by the terminal device corresponding to the decryption result that includes a communication invalid identifier and the second identifier may include: adjusting the first identifier based on second identifier, to obtain an adjusted first identifier, and encrypting the target instruction and the adjusted first identifier using the first key. In some embodiments, the corresponding operation may further include display an execution result of the target instruction on the terminal device. For example, when the decryption result includes the communication valid identifier, the terminal device may display a message notifying the user that the target instruction is successfully implemented by the IoT device.

When the decryption result includes the communication valid identifier and the execution results corresponding to the target instruction, it may indicate that the communication is valid, the IoT device has performed a target operation based on the target instruction, and the execution result is obtained. At this time, the terminal device may use the update rule to adjust the first identifier, where the update rule may be a rule negotiated by the terminal device and the IoT device. For example, the terminal device and the IoT device may negotiate that for each valid communication, the identifier value of the first identifier and the identifier value of the second identifier may be respectively increased by one (it should be noted that, of course, the update rule may be set differently, for example, for each valid communication, the identifier value of the first identifier and the identifier value of the second identifier value may be respectively increased by two, or the identifier value of the first identifier may be increased by one and the identifier value of the second identifier may be subtracted by two, which is not limited in the present disclosure). Specifically, the update rule may be that for each valid communication, the terminal device may increase the identifier value of the first identifier by one, and the IoT device may increase the identifier value of the second identifier by one. For example, if the identifier value of the first identifier is "0258147", the adjusted identifier value of the first identifier, which is non-initial value of the first identifier, may be "0258148," and the corresponding IoT device may also adjust the identifier value of the second identifier, which is non-initial value of the second identifier, based on the update rule.

When the decryption result includes the communication invalid identifier and the second identifier, it may indicate that the communication is invalid. When the communication is invalid, the terminal device may adjust the first identifier based on the decrypted second identifier (such as adjusting the first identifier using the initial negotiated correspondence). For example, the identifier value of the first identifier may start from 1, and each valid communication may increase the identifier value of the first identifier by one; the identifier value of the second identifier may start from 10000, and each valid communication may decrease the identifier value of the second identifier by one. As such, the first identifier being 1 may correspond to the second identifier being 10000, and the first identifier being 2 may correspond to the second identifier 9999. By analogy, when the identifier value of the second identifier is known, the identifier value of the first identifier can be adjusted accordingly, such that the adjusted first identifier can correspond to the second identifier. The terminal device may further use the first key to perform the process of encrypting the adjusted first identifier and the target instruction to obtain an adjusted ciphertext, and forward the adjusted ciphertext to the IoT device through the IoT platform, such that the IoT device may decrypt the adjusted ciphertext, execute the target operation/instruction and return the execution result. At the same time, it may also be necessary to use the update rule to update the second identifier. After receiving the communication valid identifier, the terminal device may use the update rule to adjust the identifier value of the first identifier accordingly, and the communication ends.

Therefore, in the embodiments provided in the present disclosure, the process of data exchange between the terminal device and the IoT device through the IoT platform are being carried out through ciphertext. The encryption process is not only proceeded with the negotiated key, but also involves identifier to prevent unpredicted communication from other unauthorized devices and improve the security of data communication.

It should be noted that before the terminal device communicates with the IoT device, the terminal device and the IoT device may need to be bound. The binding process of the terminal device and the IoT device will be described in detail below with reference to FIG. 3.

Figure 3:
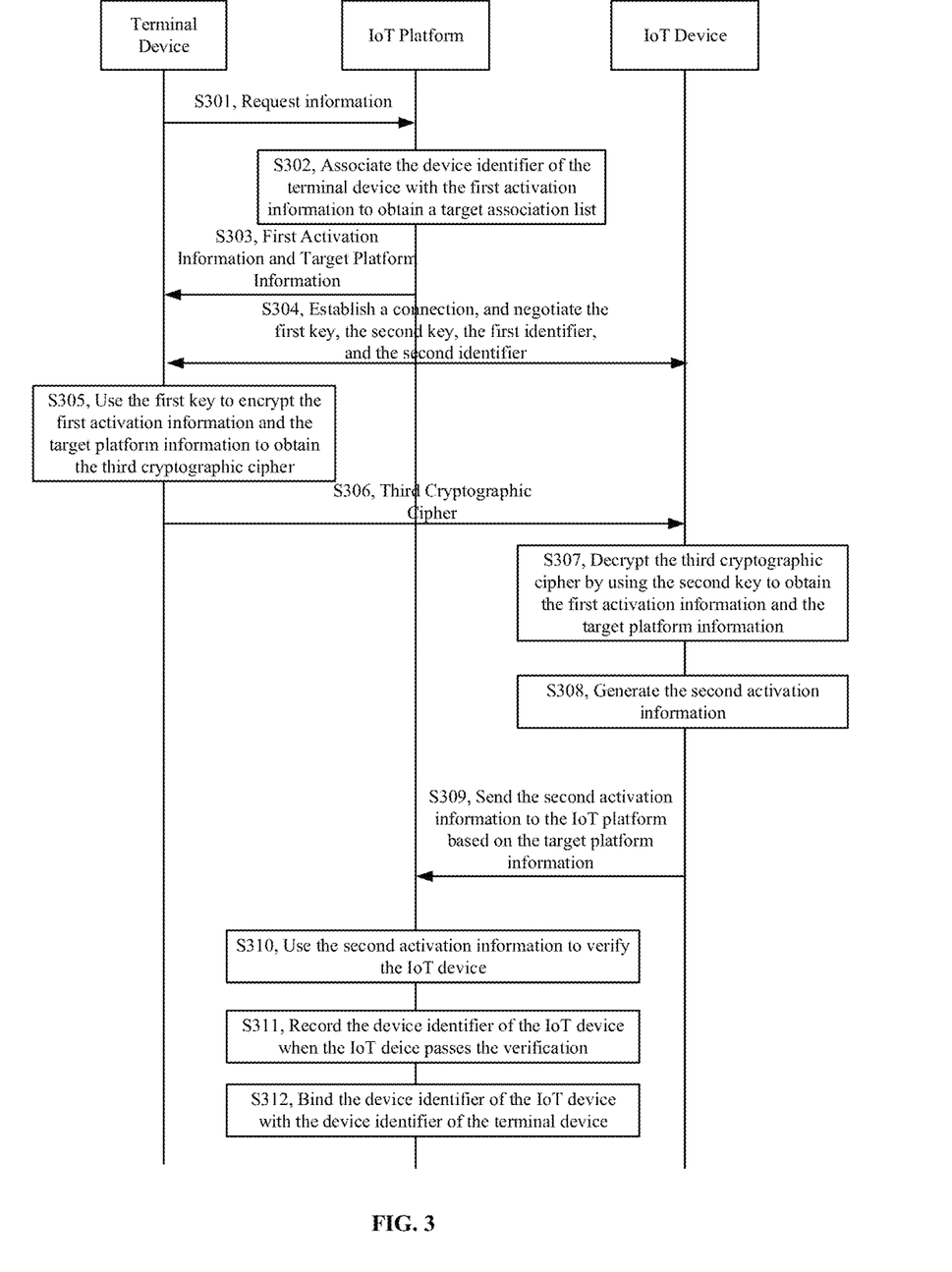
FIG. 3 is a schematic diagram of a binding process between a terminal device and an IoT device according to an embodiment of the present disclosure.

FIG. 3 is a schematic diagram of a binding process between a terminal device and an IoT device according to an embodiment of the present disclosure. The binding process will be described in detail below.

S301, the terminal device sends request information to the IoT platform.

In some embodiments, the terminal device can send the request information to the IoT platform, and the request information may request the IoT platform to return first activation information and target platform information. The request information may include the device identifier of the terminal device. The first activation information may be activation information associated with the device identifier of the terminal device. In addition, the first activation information may be time-sensitive. That is, the first activation information may be valid within a target period of time, and would be invalid if the target period of time is exceeded. If the first activation information is invalid, the terminal device may need to obtain the first activation information from the IoT platform again.

S302, the IoT platform associates the device identifier of the terminal device with the first activation information to obtain a target association list.

S303, the IoT platform sends the first activation information and the target platform information to the terminal device.

In some embodiments, the IoT platform may send the first activation information and the target platform information to the terminal device. The target platform information may include, but is not limited to, the Internet protocol (IP) address of the IoT platform, the domain name of the IoT platform, etc.

S304, the terminal device establishes a connection with the IoT device, and negotiate the first key, the second key, the first identifier, and the second identifier.

In some embodiments, the terminal device may scan and connect to the IoT device. The connection method is not limited in the present disclosure. For example, the connection may be established through wireless network, Bluetooth, and other connection methods to realize the direct connection between the terminal device and the IoT device. After the terminal device and the IoT device establish a connection, the terminal device and the IoT device may negotiate the keys and identifiers for communication. In particular, the first key and the first identifier may correspond to the terminal device, and the second key and the second identifier may correspond to the IoT device. In addition, the identifier may include an initial value and non-initial value(s). The terminal device and the IoT device may also negotiate an update rule of the identifier after the connection is established. The update rule has been described above, and the details will not be repeated here.

It should be noted that the terminal device may obtain the first activation information and the target platform information through the processes at S301 to S303, and establish a connection with the IoT device and negotiate the first key, second key, first identifier, and second identifier through the process at S304. However, the order of execution of these processes is not restrictive. That is, the processes at S301 to S303 may be executed first, or the process at S304 may be executed first. Alternatively, these processes may be executed at the same time, which is not limited in the present disclosure.

S305, the terminal device uses the first key to encrypt the first activation information and the target platform information to obtain a third ciphertext.

In some embodiments, after receiving the first activation information and the target platform information returned by the IoT device, the terminal device may use the first key negotiated with the IoT device to encrypt the first activation information and the target platform information to obtain the third ciphertext.

S306, the terminal device sends the third ciphertext to the IoT device.

S307, the IoT device uses the second key to decrypt the third ciphertext to obtain the first activation information and the target platform information.

In some embodiments, since the terminal device and the IoT device have negotiated keys, the IoT device can use the second key to decrypt the third ciphertext to obtain the first activation information and the target platform information.

S308, the IoT device generates the second activation information.

In some embodiments, after the IoT device decrypts the first activation information and the target platform information, the IoT device may generate the second activation information based on the first activation information. The second activation information may include the first activation information and the device identifier of the IoT device.

S309, the IoT device sends the second activation information to the IoT platform based on the target platform information.

In some embodiments, the IoT device may send the second activation information to the IoT device based on the target platform information.

S310, the IoT platform uses the second activation information to verify the IoT device.

In some embodiments, after the IoT platform receives the second activation information sent by the IoT device, the IoT device may use the second activation information to verity the IoT device. The process of how the IoT platform verifies the IoT device based on the second activation information will be described in detail below.

Before verifying the IoT device, the IoT platform may record the basic information of the IoT device (e.g., the device identifier of the IoT device. Of course, the basic information may also include other information, which is not limited in the present disclosure) in advance, then it may use the device identifier of the IoT device from the second activation information and the basic information of the IoT device entered in advance to determine whether the IoT device is registered. If the IoT device is registered, determine whether the time when the IoT platform receives the second activation information is within the target period of time. Since the activation information may be time-sensitive (i.e., the second activation information may only be valid within the target period of time and may be invalid over the target period of time), if the time when the second activation information is received is within the target period of time, the IoT platform may search for the first activation information from the target association list (the target association list may be an association list corresponding to the device identifier of the terminal device stored in the IoT platform). If the first activation information exists in the target association list, it is determined that the IoT device passes the verification. If the IoT device is not registered, the time when the second activation information is received is not within the target period of time, the IoT platform cannot locate the first activation information or at least one of the above situations and their combinations happens, it is determined that the IoT device fails the verification.

In some embodiments, the IoT device may be determined as passing the verification when all the following conditions are met: the IoT device is registered in the IoT platform, the time when the IoT platform receives the second activation information is within the target period of time, and the IoT platform can locate the first activation information from the target association list. In addition, as long as the answer to one of the three conditions is negative, the IoT device may be determined as an unauthorized device.

It should also be noted that there is no specific limitation on the time when the IoT platform enters the basic information of the IoT device, as long as the entry is made before the IoT platform verifies the IoT device.

S311, the IoT platform records the device identifier of the IoT device when the IoT device passes the verification.

S312, the IoT platform binds the device identifier of the IoT device with the device identifier of the terminal device.

Therefore, the terminal device may be bound in advance before communicating with the IoT device, and negotiate the keys and identifiers for communication. In this way, when communicating, the data exchange between the IoT device and the terminal device can be carried out using ciphertexts. In addition, the ciphertext not only encrypts the data with the negotiated keys, but also includes identifiers added during the encryption process, which can prevent communication from other unauthorized devices and improve the security of data communication.

The above embodiments of the present disclosure have been described from the perspective of a data processing method. The following embodiments of the present disclosure will be described from the perspectives of the terminal device, the IoT device, and the IoT platform.

Figure 4:
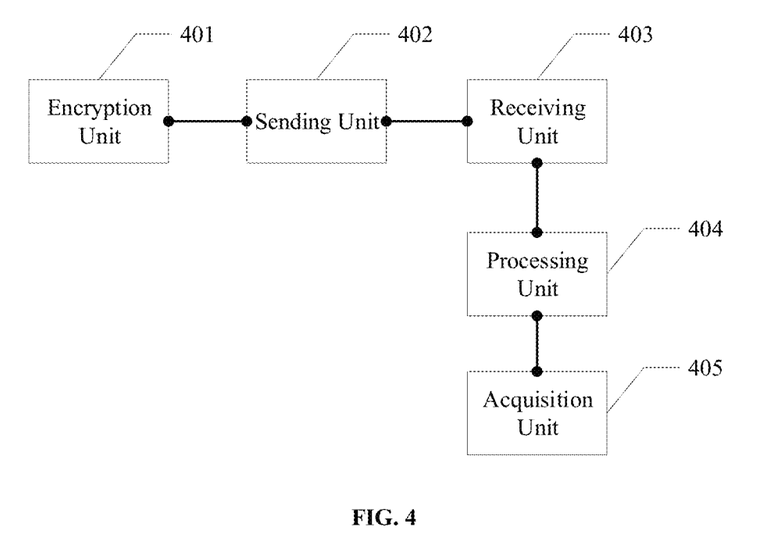
FIG. 4 is a schematic diagram of a terminal device according to an embodiment of the present disclosure.

FIG. 4 is a schematic diagram of a terminal device according to an embodiment of the present disclosure.

As shown in FIG. 4, the terminal device includes an encryption unit 401, a sending unit 402, a receiving unit 403, and a processing unit 404.

The encryption unit 401 may be configured to use the first key to encrypt the target instruction and the first identifier to obtain the first ciphertext.

The sending unit 402 may be configured to send the first ciphertext to the IoT device through the IoT platform, such that the IoT device may decrypt the first ciphertext using the second key to obtain the target instruction and the first identifier, and determine whether the first identifier matches a second identifier stored locally and come to a matching result. The first key and the second key may be negotiated by the terminal device and the IoT device.

The receiving unit 403 may be configured to receive the second ciphertext returned by the IoT device through the IoT platform, and use the first key to decrypt the second ciphertext to obtain the decryption result. The second ciphertext may be obtained by the IoT device encrypting the matching result using the second key.

The processing unit 404 may be configured to perform the corresponding operation using the decryption result.

In some embodiments, the initial value of the first identifier and the initial value of the second identifier may be negotiated by the terminal device and the IoT device. The non-initial value(s) of the first identifier and the non-initial value(s) of the second identifier may be adjusted respectively based on the initial value of the first identifier and the initial value of the second identifier according to the update rule negotiated by the terminal device and the IoT device.

In some embodiments, when the decryption result includes the communication valid identifier and the execution result, the processing unit 404 may be further configured to adjust the first identifier using the second identifier and encrypt the target instruction and the adjusted first identifier using the first key.

In some embodiments, the terminal device may further include an acquisition unit 405. The acquisition unit 405 may be configured to acquire the first activation information and the target platform information of the IoT platform. The first activation information may be sent by the IoT platform. And in the IoT platform, the first activation information may be associated with the device identifier of the terminal device.

The encryption unit 401 may be further configured to use the first key to encrypt the first activation information and the target platform information to obtain the third ciphertext.

The sending unit 402 may be further configured to send the third ciphertext directly to the IoT device.

Therefore, in the embodiments of the present disclosure, when the terminal device sends the target instruction to the IoT device, the terminal device can encrypt the target instruction using the key and identifier negotiated with the IoT device to obtain the ciphertext. The terminal device can further forward the ciphertext to the IoT device through the IoT platform, such that the IoT device can perform decryption based on the corresponding key, perform a determination/matching process based on the negotiated identifier to obtain the matching result, and generate the corresponding ciphertext and return a value back to the terminal device. The terminal device can decrypt the ciphertext to obtain the decryption result, and execute the corresponding operation based on the decryption result. As such, the data communication between the terminal device and the IoT device not only encrypt the data with the negotiated keys, but also add the identifier during the encryption process, which can prevent communication from other unauthorized devices and improve the security of data communication.

Figure 5:
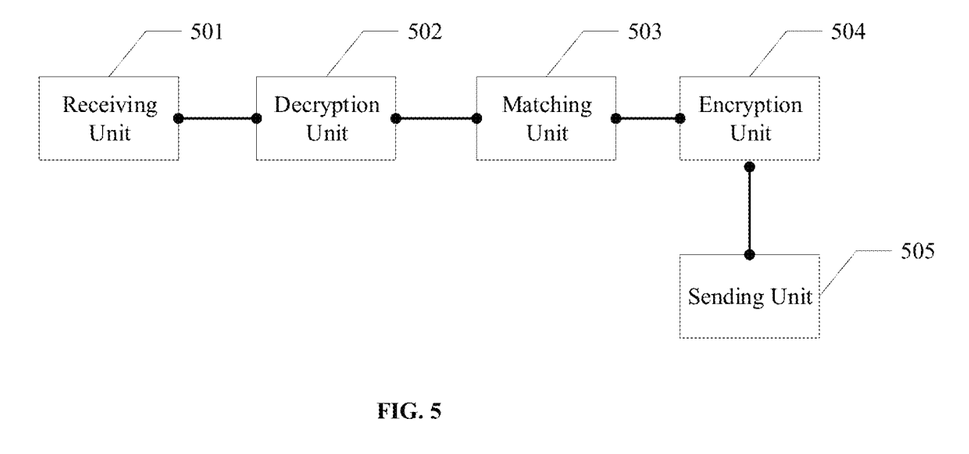
FIG. 5 is a schematic diagram of an IoT device according to an embodiment of the present disclosure.

FIG. 5 is a schematic diagram of the IoT device according to an embodiment of the present disclosure.

As shown in FIG. 5, the IoT device includes a receiving unit 501, a decryption unit 502, a matching unit 503, an encryption unit 504, and a sending unit 505.

The receiving unit 501 may be configured to receive the first ciphertext forwarded by the IoT platform, where the first ciphertext may be obtained by the terminal device encrypting the first identifier and the target instruction using the first key.

The decryption unit 502 may be configured to decrypt the first ciphertext using the second key to obtain the target instruction and the first identifier.

The matching unit 503 may be configured to determine whether the first identifier matches a second identifier stored locally and come to a matching result. The first key and the second key may be negotiated by the terminal device and the IoT device.

The encryption unit 504 may be configured to encrypt the matching result using the second key to obtain the second ciphertext.

The sending unit 505 may be configured to send the second ciphertext to the terminal device through the IoT platform, such that the terminal device may use the first key to decrypt the second ciphertext to obtain the decryption result, and use the decryption result to perform the corresponding operation.

In some embodiments, the initial value of the first identifier and the initial value of the second identifier may be negotiated by the terminal device and the IoT device. The non-initial value(s) of the first identifier and the non-initial value(s) of the second identifier may be adjusted based on the update rule negotiated by the terminal device and the IoT device.

In some embodiments, when the matching result shows that the identifier value of the first identifier matches the identifier value of the second identifier, the encryption unit 504 may be configured to cause the IoT device to perform a target operation based on the target instruction to obtain an execution result; and cause the IoT device to use the second key to encrypt the execution result and the communication valid identifier to obtain the second ciphertext.

In some embodiments, when the matching result shows that the first identifier does not match the second identifier, the encryption unit 504 may be further configured to cause the IoT device to determine the identifier value of the second identifier; and cause the IoT device to use the second key to encrypt the identifier value of the second identifier and the communication invalid identifier to obtain the second ciphertext.

In some embodiments, the receiving unit 501 may also be used to receive the third ciphertext. The third ciphertext may be obtained by the terminal device encrypting the first activation information and the target platform information using the first key. The first activation information and the target platform information may be obtained by the terminal device from the IoT platform, and the first activation information may be associated with the device identifier of the terminal device.

The decryption unit 502 may be further configured to use the second key to decrypt the third ciphertext to obtain the first activation information and the target platform information.

The sending unit 505 may be further configured to send the second activation information to the IoT platform based on the target platform information. The second activation information may include the first activation information and the device identifier of the IoT device. The second activation information may be used to bind the device identifier of the terminal device associated with the first activation information and the device identifier of the IoT device when the IoT platform determines that the first activation information is stored (that is, when the IoT platform can locate the first activation information).

Therefore, in the embodiments of the present disclosure, the IoT device can receive the first ciphertext, decrypt the first ciphertext based on the second key to obtain the first identifier and the target instruction, and determine whether the first identifier matches a second identifier stored locally and come to a matching result. The IoT device can further generate the second ciphertext based on the matching result and the second key, and send the second ciphertext to the terminal device through the IoT platform. The terminal device can decrypt the second ciphertext with the first key to obtain the decryption result, and perform the corresponding operation based on the decryption result. As such, when the terminal device and the IoT device communicate with each other, not only the data are encrypted by the negotiated keys, but also identifier(s) can be added during the encryption process, which can prevent unexpected communication from unauthorized devices and improve the security of data.

Figure 6:
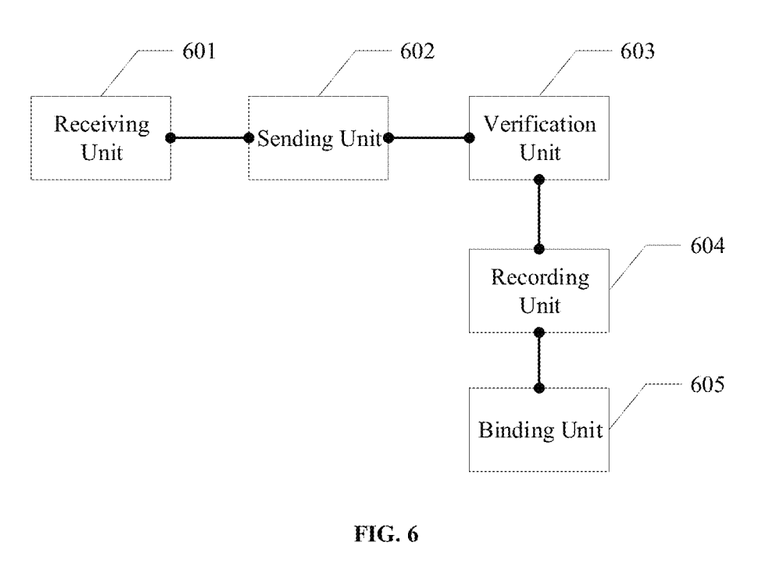
FIG. 6 is a schematic diagram of an IoT platform according to an embodiment of the present disclosure.

FIG. 6 is a schematic diagram of the IoT platform according to an embodiment of the present disclosure.

As shown in FIG. 6, the IoT platform includes a receiving unit 601 and a sending unit 602.

The receiving unit 601 may be configured to receive the first ciphertext (e.g., from the terminal device). The first ciphertext may be obtained by the terminal device using the first key to encrypt the first identifier and the target instruction.

The sending unit 602 may be configured to send the first ciphertext to the IoT device, such that the IoT device may use the second key to decrypt the first ciphertext to obtain the target instruction and the first identifier, and determine whether the first identifier matches a second identifier stored locally and come to a matching result. The IoT device can further encrypt the matching result using the second key to obtain the second ciphertext, and return the second ciphertext. The first key and the second key may be obtained through a negotiation between the terminal device and the IoT device.

In some embodiments, the receiving unit 601 may be further configured to receive the second ciphertext (e.g., from the IoT device).

In some embodiments, the sending unit 602 may be further configured to send the second ciphertext to the terminal device, such that the terminal device may use the first key to decrypt the second ciphertext to obtain a decryption result, and perform the corresponding operation based on the decryption result.

In some embodiments, the initial value of the first identifier and the initial value of the second identifier may be negotiated by the terminal device and the IoT device. The non-initial value(s) of the first identifier and the non-initial value(s) of the second identifier may be adjusted based on the update rule negotiated by the terminal device and the IoT device.

In some embodiments, the receiving unit 601 may be further configured to receive the request information sent from the terminal device, and the request information may include the device identifier of the terminal device.

In some embodiments, the sending unit 602 may be further configured to use the request information to return the first activation information and the target platform information to the terminal device, such that the terminal device may use the first key the encrypt the first activation information and the target platform information to obtain the third ciphertext, and send the third ciphertext to the IoT device. The first activation information may be associated with the device identifier of the terminal device.

In some embodiments, the receiving unit 601 may be further configured to receive the second activation information. The second activation information may include the first activation information, the device identifier of the IoT device, and the device type of the IoT device.

In some embodiments, the IoT platform may further include a verification unit 603, a recording unit 604, and a binding unit 605.

The verification unit 603 may be configured to use the second activation information to verify the IoT device.

The recording unit 604 may be configured to record the device identifier of the IoT device when the verification of the IoT device is successful.

The binding unit 605 may be configured to bind the device identifier of the IoT device with the device identifier of the terminal device.

In some embodiments, the verification unit 603 may be specifically configured to use the device identifier of the IoT device to verify the registration state of the IoT device; determine whether the time when the second activation information is received is within the target period of time if the IoT device is registered; determine whether the IoT platform locates the first activation information from the target association list if the time when the second activation information is received is within the target period of time. The target association list is an association list stored in the IoT platform and is corresponding to the device identifier of the terminal device; determine that the IoT device has passed the verification if the first activation information exists in the association list; and determine that the IoT device has failed the verification if the IoT device is not registered, the time when the second activation information is received is not within the target period of time, or the IoT platform does not locate the first activation information or at least one of the above situations or their combinations happens.

Therefore, in the embodiments of the present disclosure, regardless of whether the IoT platform receives the ciphertext of the terminal device or the ciphertext of the IoT device, the encryption process to obtain the ciphertext not only includes encrypting the data with the negotiated keys, but also includes adding initial or adjusted identifier(s), thereby preventing unexpected communication from other unauthorized devices and improving the security of data communication.

Figure 7:
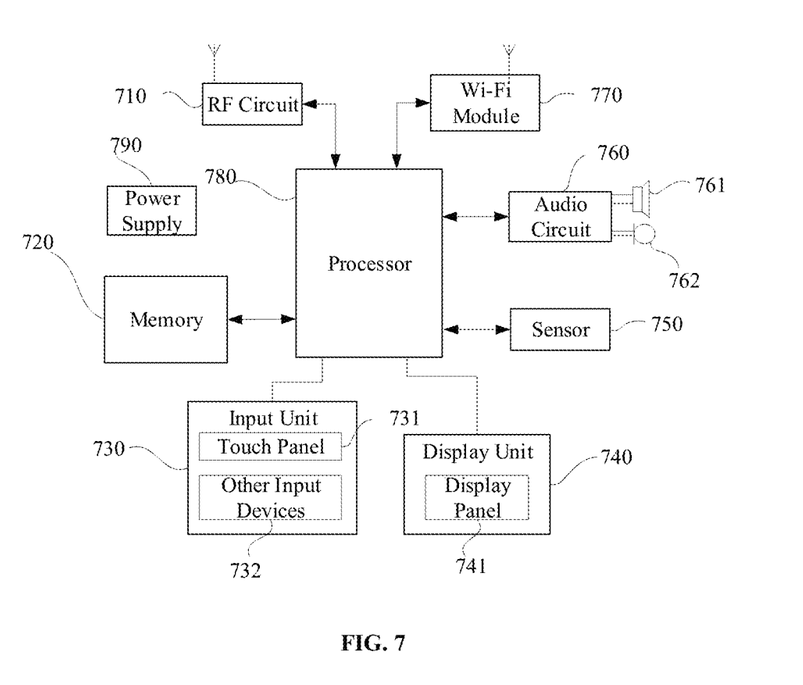
FIG. 7 is a schematic diagram of a hardware structure of the terminal device according to an embodiment of the present disclosure.

An embodiment of the present disclosure further provides another terminal device. As shown in FIG. 7, for the ease of description, only the parts related to the embodiments of the present disclosure are shown. For specific technical details that are not disclosed, reference may be made to the method embodiments of the present disclosure. The terminal device may be any terminal device such as mobile phone, tablet, personal digital assistant (PDA), point of sales (POS), vehicle-mounted computer, etc. The terminal device will be described using a mobile phone as an example.

FIG. 7 is a block diagram of a part of the structure of a mobile phone related to a terminal according to an embodiment of the present disclosure. As shown in FIG. 7, the mobile phone includes a radio frequency (RF) circuit 710, a memory 720, an input unit 730, a display unit 740, a sensor 750, an audio circuit 760, a wireless fidelity (Wi-Fi) module 770, a processor 780, and a power supply 790. Those skilled in the art can understand that the structure of the mobile phone shown in FIG. 7 does not constitute a limitation on the mobile phone. A mobile phone may include more or fewer components than what is shown in FIG. 7, combine some components, or arrange different components.

The various components of the mobile phone will be described in detail below with reference to FIG. 7.

The RF circuit 710 can be used for receiving and sending signals in the process of sending and receiving messages or making calls. More specifically, after receiving the downlink data of the based station, the RF circuit 710 can send the downlink data to the processor 780 for processing. In addition, the RF circuit 710 can send the designed uplink data to the baes station. Generally, the RF circuit 710 may include, but is not limited to, an antenna, one or more amplifiers, a transceiver, a coupler, a low noise amplifier (LNA), a duplexer, and the like. In addition, the RF circuit 710 can also communicate with the network and other devices through wireless communication. The wireless communication may include any communication standard or protocol, including, but not limited to, global system of mobile communication (GSM), general packet radio service (GPRS), code division multiple access (CDMA), wideband code division multiple access (WCDMA), long term evolution (LTE), email, short messaging service (SMS), etc.

The memory 720 can store software programs and module. The processor 780 can execute various functional applications and data processing of the mobile phone by running the software programs and modules stored in the memory 720. The memory 720 may mainly include a program storage area and a data storage area. The program storage area may store an operating system, an application program needed by at least one function (such as a sound playing function, an image playing function, etc.). The data storage area can store data created along the use of the mobile phone (such as audio data, phone book, etc.). In addition, the memory 720 may include a high-speed random access memory, and may also include a non-volatile memory, such as one or more of a magnetic disk storage device, a flash memory device, or other volatile solid-state storage devices.

The input unit 730 can be used to receive input digital or character information, and generate signal input related to user settings and function control of the mobile phone. More specifically, the input unit 730 may include a touch panel 731 and other input devices 732. The touch panel 731, also known as a touch screen, can collect user touch operations on or near the touch panel (e.g., the user may use any suitable objects or accessories, such as fingers, stylus, etc. to operate on or near the touch panel 731), and drive the corresponding connected device based on a predetermined program. In some embodiments, the touch panel 731 may include two parts, such as a touch detection device and a touch controller. The touch detection device can detect the user's touch operation and get the information of the touch operation, and transmit it to the touch controller. The touch controller can receive the touch information from the touch detection device, converts it to contact points with coordinates, send contact points to the processor 780, and receive and execute the instructions send by the processor 780. In addition, the touch panel 731 may be realized by various types, such as resistive, capacitive, infrared, and surface acoustic wave. In addition to the touch panel 731, the input unit 730 may also include other input devices 732. More specifically, the other input devices 732 may include, but are not limited to, one or more of a physical keyboard, function keys (such as volume control buttons, switch buttons, etc.), a trackball, a mouse, and a joystick.

The display unit 740 may be used to display information input by the user, information provided to the user, and various menus of the mobile phone. The display unit 740 may include a display panel 741. In some embodiments, the display panel 741 may be configured in the form of a liquid crystal display (LCD), an organic light-emitting diode (OLDE), etc. Further, the touch panel 731 may cover the display panel 741. When the touch panel 731 detects a touch operation, the touch panel 731 can transmit the touch operation to the processor 780 to determine the type of the touch event, and then the processor 780 can provide the corresponding visual output on the display panel 741 based on the type of the touch event. Although in FIG. 7 the touch panel 731 and the display panel 741 are illustrated as two independent components to implement the input and output functions of the mobile phone, in some embodiments, the touch panel 731 and the display panel 741 can be integrated to realize the input and output functions of the mobile phone.

The mobile phone may also include at least one sensor 750, such as a light sensor, a motion sensor, and other sensors. More specifically, the light sensor may include an ambient light sensor and a proximity sensor. The ambient light sensor can adjust the brightness of the display panel 741 based on the brightness of the ambient light. The proximity sensor can turn off the display panel 741 and/or the backlight when the phone is moved nearby the ear. As a type of motion sensor, an accelerometer sensor can detect the magnitude of acceleration in various directions (generally in three-axis), and can detect the magnitude and direction of gravity when it is stationary. Further, the accelerometer sensor can also be used to recognize the attitude of the mobile phone (such as horizontal and vertical screen switching, related games, magnetometer attitude calibration), vibration recognition related functions (such as pedometer, tapping), etc. The mobile phone may further include other sensors such as gyroscopes, barometers, hygrometers, thermometers, and infrared sensors, which will not be described in detail here.

The audio circuit 760, a speaker 761, and a microphone 762 can provide an audio interface between the user and the mobile phone. On one hand, the audio circuit 760 can transmit the electrical signal converted from the received audio data to the speaker 761, and the speaker 761 can convert the electrical signal into a sound signal and output the sound signal. On the other hand, the microphone 762 can convert the collected sound signals into electrical signals, which may be received by the audio circuit 760, and then convert the electrical signals into audio data. After the audio data is sent to the processor 780 for processing, it may be sent to another mobile phone via the RF circuit 710, or the audio data may be sent to the memory 720 for further processing.

Wi-Fi is a short-distance wireless transmission technology. The mobile phone can help users send and receive emails, browse web pages, and access steaming media through the Wi-Fi module 770. The Wi-Fi module 770 can also provide users with wireless broadband Internet access. Although FIG. 7 illustrated the Wi-Fi module 770, it is understandable that the Wi-Fi module 770 may not be a needed component of the mobile phone, and it may be omitted as needed without changing the essence of the present disclosure.

The processor 780 may be the control center of the mobile phone. The processor 780 may be configured to use various interfaces and wires to connect the various parts of the entire mobile phone. By running or executing the software programs and/or modules stored in the memory 720, and calling the data stored in the memory 720, the processor 780 can perform various functions and data processing of the mobile phone. In some embodiments, the processor 780 may include one or more processing units. In some embodiments, the processor 780 may integrate an application processor and a modem processor. The application processor mainly deals with the operating system, user interface, and application programs, and the modem process mainly deals with wireless communication. It can be understood that the foregoing modem processor may not be integrated into the processor 780.

The mobile phone may also include a power supply 790 (such as a battery) for powering various components. In some embodiments, the power supply may be logically connected to the processor 780 through a power management system, such that functions such as charging, discharging, and power consumption management can be managed through the power management system.

Although not shown in FIG. 7, the mobile phone may further include a camera, a Bluetooth module, etc., which will not be described in detail here.

In the embodiments of the present disclosure, the foregoing operations performed by the terminal device may be performed by the processor 780.

Figure 8:
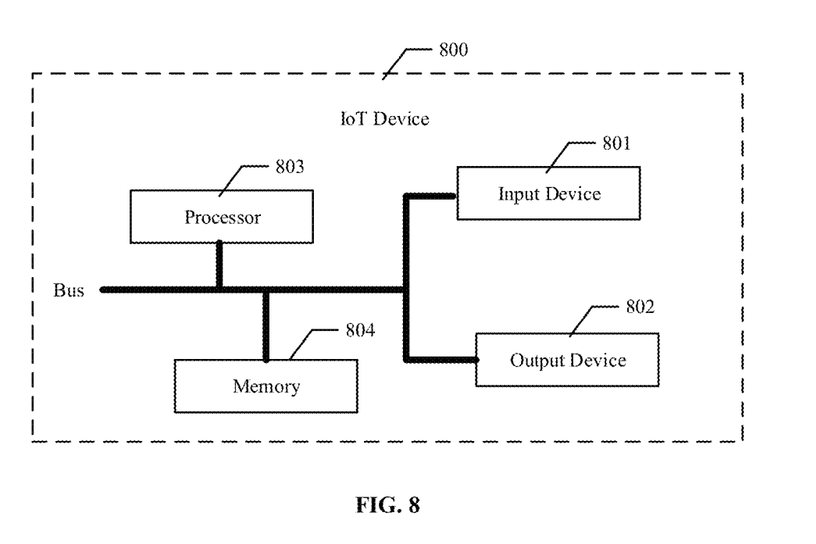
FIG. 8 is a schematic diagram of a hardware structure of the IoT device according to an embodiment of the present disclosure.

FIG. 8 is a schematic diagram of a hardware structure of the IoT device according to an embodiment of the present disclosure. As shown in FIG. 8, the IoT device 800 includes an input device 801, an output device 802, a processor 803, and a memory 804 (the number of processor 803 may be one or more, and one processor 803 is illustrated as an example in FIG. 8). In some embodiments, the input device 801, the output device 802, the processor 803, and the memory 804 may be connected by a bus or in other ways. In FIG. 8, the bus connection is used as an example.

The foregoing operations performed by the IoT device may be performed by the processor 803 by calling the operation instructions stored in the memory 804.

Figure 9:
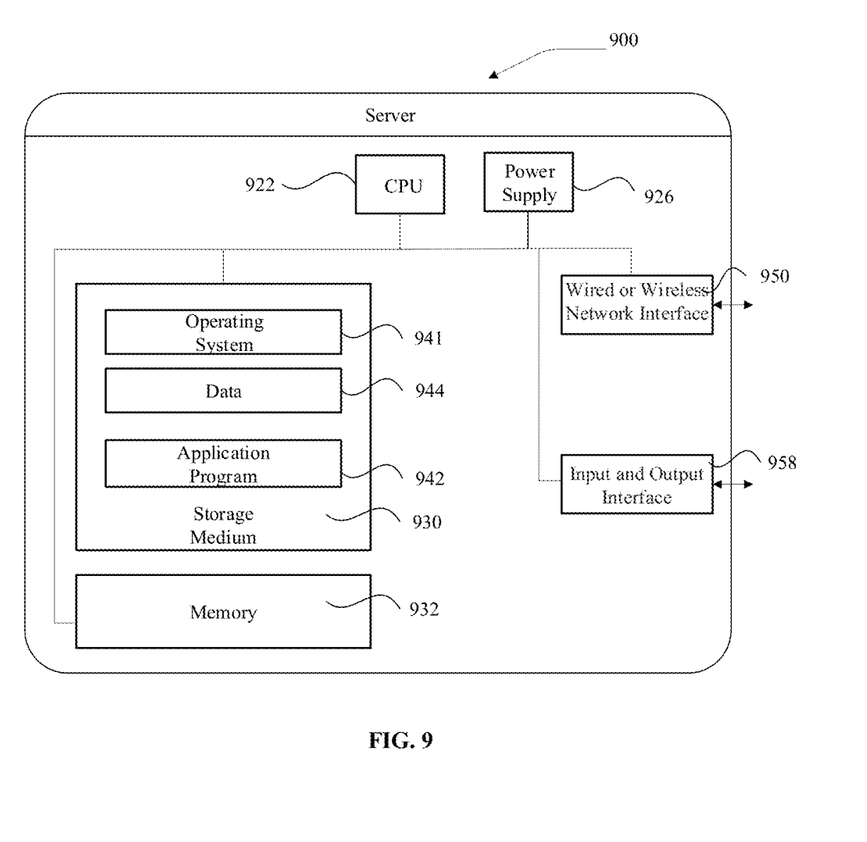
FIG. 9 is a schematic diagram of a hardware structure of a server according to an embodiment of the present disclosure.

FIG. 9 is a schematic diagram of a hardware structure of a server according to an embodiment of the present disclosure. A server 900 may have relatively large differences due to different configurations or performance. The server 900 may include one or more central processing units (CPU) 922 (e.g., one or more processors), a memory 932, and one or more storage medium 930 (e.g., one or more storage devices in a large amount) for storing application programs 942 or data 944. The memory 932 and the storage medium 930 may be a non-transitory storage. The program stored in the storage medium 930 may include one or more modules (not shown in FIG. 9), and each module may include a series of instruction operations on the server. Further, the CPU 922 may be configured to communicate with the storage medium 930 and execute the series of instruction operations in the storage medium 930 on the server 900.

In some embodiments, the server 900 may also include one or more power supplies 926, one or more wired or wireless network interfaces 950, one or more input and output interfaces 958, and/or one or more operating systems 941, such as Windows Server™ Mac OS X™, Unix™, Linus™, FreeBSD™, etc.

The processes performed by the IoT platform in the foregoing embodiment may be realized on one or more servers as shown in FIG. 9.

An embodiment of the present disclosure further provides a computer-readable storage medium on which a program may be stored. When the program is executed by a processor, causes the processor to perform the data processing method described above.

An embodiment of the present disclosure further provides a processor, which can be used to run a program. The processes of the data processing method described above can be performed when the program runs.

An embodiment of the present disclosure further provides a terminal device. The terminal device may include a processor, a memory, and a program stored in the memory and executed by the processor. The program code can be loaded and executed by the processor to implement the processes of the data processing method described above.

An embodiment of the present disclosure further provides a computer program product. When the computer program product is executed on a data processing device, processes of the data processing method described above can be performed.

In the above embodiments, the descriptions of the various embodiments focus on different aspects, and for the parts that are not detailed described in a certain embodiment, reference can be made to the related descriptions of other embodiments.

It can be appreciated by those skilled in the art that for the specific working process of the system, the apparatus, and the module described above, reference can be made to the corresponding process in the foregoing embodiments of the method, and the details description is omitted herein for the convenience and brevity of the description.

In various embodiments, the disclosed modules/units for the exemplary terminal device, the exemplary IoT device, and the exemplary server as depicted above can be configured in one device or configured in multiple devices as desired. The units disclosed herein can be integrated in one unit or in multiple units for processing. Each of the units disclosed herein can be divided into one or more sub-units, which can be recombined in any manners. In addition, each functional module/unit in various disclosed embodiments can be integrated in a processing unit, or each module/unit can exist separately and physically, or two or more modules/units can be integrated in one unit. The integrated units as disclosed above can be implemented in the form of hardware (e.g., processing circuitry and/or memory), software functional unit(s) (e.g., developed using one or more computer programming languages), or a combination thereof.

A person skilled in the art should understand that the implementations of the present disclosure may be provided as a method, a system, or a computer program product. Therefore, the present disclosure may use a form of hardware only implementations, software only implementations, or implementations with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the implementations of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or other programmable devices, thereby generating computer-implemented processing. Therefore, the instructions executed on the computer or other programmable devices provide steps for implementing a specific function in one or more processes in the flowcharts and/or in one or more blocks in the block diagrams.

In a typical configuration, a computer device includes one or more processors (CPU), an input/output interface, a network interface, and a memory.

The memory may include forms such as a non-persistent storage in a computer readable medium, a random access memory (RAM) and/or a non-volatile memory, such as a read-only memory (ROM) or a flash memory (flash RAM). The memory is an example of the computer readable medium.

The computer readable medium includes a persistent and a non-persistent, a removable and a non-removable medium, which implement information storage by using any method or technology. Information may be a computer readable instruction, a data structure, a module of a program or other data. Examples of a storage medium of a computer include, but are not limited to: a phase change memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc-read only memory (CD-ROM), a digital versatile disc (DVD) or another optical storage device, a cassette tape, disk and tape memory or another magnetic storage device, or any other non-transmission media, which may be configured to store information that can be accessed by a computer device. According to limitations of the present specification, the computer readable medium does not include a non-transitory medium (transitory media), such as a modulated data signal and a modulated carrier.

It should be further noted that, the terms "include", "comprise", or their any other variant is intended to cover a non-exclusive inclusion, so that a process, a method, a product, or an apparatus that includes a list of elements not only includes those elements but also includes other elements which are not expressly listed, or further includes elements inherent to such process, method, product, or apparatus. An element preceded by "includes a . . . " does not, without more constraints, preclude the existence of additional identical elements in the process, method, product, or apparatus that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application may use a form of a computer program product that is implemented on one or more computer-usable storage media (including but not limited to a disk memory, a CD-ROM, an optical memory, and the like) that include computer usable program code.

The previous descriptions are merely implementations of the present application, and are not used to limit the present application. Various changes and modifications can be made to the present application by those skilled in the art. Any modification, equivalent replacement, or improvement made without departing from the spirit and principle of the present application shall fall within the scope of the claims of the present application.

What is claimed is:

1. A data processing method implemented by a terminal device, comprising:
    negotiating a first key and a second key with an IoT (Internet of things) device;
    negotiating a first identifier and a second identifier with the IoT device;
    encrypting a target instruction and the first identifier using the first key, to obtain a first ciphertext;
    sending the first ciphertext to the IoT device through an IoT platform for the IoT device to decrypt the first ciphertext using the second key to obtain the target instruction and the first identifier, and to determine whether the first identifier matches the second identifier stored locally and come to a matching result;
    receiving a second ciphertext returned by the IoT device through the IoT platform, the second ciphertext being obtained by the IoT device by encrypting the matching result using the second key;
    decrypting the second ciphertext using the first key to obtain a decryption result, wherein the decryption result includes a communication invalid identifier; and
    performing a corresponding operation based on the communication invalid identifier included in the decryption result, comprising: adjusting the first identifier using the second identifier to obtain an adjusted first identifier.

2. The method of claim 1, wherein:
    an initial value of the first identifier and an initial value of the second identifier are negotiated by the terminal device and the IoT device; and
    a non-initial value of the first identifier and a non-initial value of the second identifier are adjusted based on an update rule negotiated by the terminal device and the IoT device.

3. The method of claim 2, wherein performing the corresponding operation based on the decryption result comprises:
    encrypting the target instruction and the adjusted first identifier using the first key.

4. The method of claim 1, further comprising:
    prior to negotiating the first key and the second key with the IoT device, receiving first activation information from the IoT platform; and
    prior to negotiating the first key and the second key with the IoT device and after the IoT platform receives from the IoT device second activation information generated based on the first activation information, getting bound to the IoT device.

5. The method of claim 4, wherein the second activation information is received by the IoT platform within a target period of time.

6. A data processing method implemented by an IoT device, comprising:
    negotiating a first key and a second key with a terminal device;
    negotiating a first identifier and a second identifier with the terminal device;
    receiving a first ciphertext forwarded by an IoT platform, the first ciphertext being obtained by the terminal device by encrypting the first identifier and a target instruction using the first key;
    decrypting the first ciphertext using the second key to obtain the target instruction and the first identifier;
    determining whether the first identifier matches the second identifier stored locally and coming to a matching result;
    encrypting the matching result using the second key to obtain a second ciphertext; and
    sending the second ciphertext to the terminal device through the IoT platform for the terminal device to decrypt the second ciphertext using the first key to obtain a decryption result and perform a corresponding operation based on the decryption result, wherein the decryption result includes a communication invalid identifier, and the corresponding operation includes adjusting by the terminal device the first identifier using the second identifier to obtain an adjusted first identifier.

7. The method of claim 6, wherein:
    an initial value of the first identifier and an initial value of the second identifier are negotiated by the terminal device and the IoT device, and
    a non-initial value of the first identifier and a non-initial value of the second identifier are adjusted based on an update rule negotiated by the terminal device and the IoT device.

8. The method of claim 6, wherein encrypting the matching result comprises:
    determining an identifier value of the second identifier; and
    encrypting the identifier value of the second identifier and the communication invalid identifier using the second key to obtain the second ciphertext.

9. The method of claim 6, further comprising:
    receiving a third ciphertext, the third ciphertext being obtained by the terminal device by encrypting first activation information and target platform information using the first key, the first activation information and the target platform information being obtained by the terminal device from the IoT platform; and
    decrypting the third ciphertext using the second key to obtain the first activation information and the target platform information.

10. A terminal device, comprising: a memory; and one or more processors configured to communicate with the memory and cause the terminal device to perform:

negotiating a first key and a second key with an IoT (Internet of things) device;

negotiating a first identifier and a second identifier with the IoT device;

encrypting a target instruction and the first identifier to obtain the first ciphertext;

sending the first ciphertext to the IoT device through an IoT platform for the IoT device to decrypt the first ciphertext using the second key to obtain the target instruction and the first identifier, and to determine whether the first identifier matches the second identifier stored locally and come to a matching result;

receiving a second ciphertext returned by the IoT device through the IoT platform the second ciphertext being obtained by encrypting the matching result by the IoT device using the second key;

decrypting the second ciphertext using the first key to obtain a decryption result, wherein the decryption result includes a communication invalid identifier; and performing a corresponding operation based on the communication invalid identifier included in the decryption result, including adjusting the first identifier using the second identifier to obtain an adjusted first identifier.

11. The device of claim 10, wherein: an initial value of the first identifier and an initial value of the second identifier are negotiated by the terminal device and the IoT device; and a non-initial value of the first identifier and a non-initial value of the second identifier are adjusted based on an update rule negotiated by the terminal device and the IoT device.

12. The device of claim 11, wherein performing the corresponding operation based on the decryption result comprises: encrypting the target instruction and the adjusted first identifier using the first key.

13. An IoT device, comprising: a memory; and one or more processors configured to communicate with the memory and cause the IoT device to perform:

negotiating a first key and a second key with a terminal device;

negotiating a first identifier and a second identifier with the terminal device;

receiving a first ciphertext forwarded by an IoT platform, the first ciphertext being obtained by the terminal device by encrypting the first identifier and a target instruction using the first key;

decrypting the first ciphertext using the second key to obtain the target instruction and the first identifier;

determining whether the first identifier matches the second identifier stored locally and coming to a matching result;

encrypting the matching result using the second key to obtain a second ciphertext; and sending the second ciphertext to the terminal device through the IoT platform for the terminal device to decrypt the second ciphertext using the first key to obtain a decryption result and perform a corresponding operation based on the decryption result, wherein the decryption result includes a communication invalid identifier, and the corresponding operation includes adjusting by the terminal device the first identifier using the second identifier to obtain an adjusted first identifier.

14. The device of claim 13, wherein: an initial value of the first identifier and an initial value of the second identifier are negotiated by the terminal device and the IoT device, and a non-initial value of the first identifier and a non-initial value of the second identifier are adjusted based on an update rule negotiated by the terminal device and the IoT device.

15. The device of claim 13, wherein encrypting the matching result using the second key to obtain the second ciphertext comprises:

encrypting the identifier value of the second identifier and the communication invalid identifier using the second key to obtain the second ciphertext.

16. The device of claim 13, wherein the one or more processors are further configured to perform:

receiving a third ciphertext, the third ciphertext being obtained by the terminal device by encrypting first activation information and target platform information using the first key, the first activation information and the target platform information being obtained by the terminal device from the IoT platform; and decrypting the third ciphertext using the second key to obtain the first activation information and the target platform information.

* * * * *